United States Patent [19]
Lehmann

[11] 3,891,252
[45] June 24, 1975

[54] LOCK MECHANISM
[75] Inventor: Adolf Lehmann, Schonaich, Germany
[73] Assignee: Daimler-Benz Aktiengesellschaft, Germany
[22] Filed: May 30, 1974
[21] Appl. No.: 474,811

[30] Foreign Application Priority Data
May 30, 1973 Germany............................ 2327487

[52] U.S. Cl. .................... 292/6; 292/8; 292/DIG. 5; 296/136
[51] Int. Cl. .............................................. E05c 5/00
[58] Field of Search .......... 292/4, 5, 6, 7, 8, DIG. 5; 296/136, 137 R, 137 C, 137 D; 49/394, 395, 465; 160/37, 19

[56] References Cited
UNITED STATES PATENTS
| | | | |
|---|---|---|---|
| 2,242,844 | 5/1941 | Baier...................................... | 292/8 |
| 2,747,928 | 5/1956 | Oliver............................. | 296/136 X |
| 2,943,693 | 7/1960 | Norrie................................ | 292/7 X |
| 3,338,624 | 8/1967 | Champion........................... | 296/136 |
| 3,342,516 | 8/1967 | Morand .................................. | 292/6 |

Primary Examiner—Robert L. Wolfe
Attorney, Agent, or Firm—Craig & Antonelli

[57] ABSTRACT

A closure and locking mechanism for the lid of a compartment receiving a foldable top and for a curved fabric-retaining member forming the rear termination of the foldable top; two locking devices are thereby provided disposed opposite one another for locking the foldable-top compartment lid in its closed condition as also a lock for locking the fabric-retaining member in its position in which the closed, unfolded top is stretched, which are all actuatable by way of a single remote control installation; the remote control installation thereby includes two entrainment members mounted on its pivot shaft, of which a first entrainment member is in operative connection with the nearer locking device by way of elongated aperture guidances while the other entrainment member is in operative connection with a bell crank by way of an angle rod and adjoining connecting rod; in addition to a Bowden cable leading to the second locking device, also an actuating linkage acting by way of a claw lever on a latching lever of the lock for the fabric retaining member is pivotally connected with the bell crank.

20 Claims, 6 Drawing Figures

PATENTED JUN 24 1975

3,891,252

SHEET 1

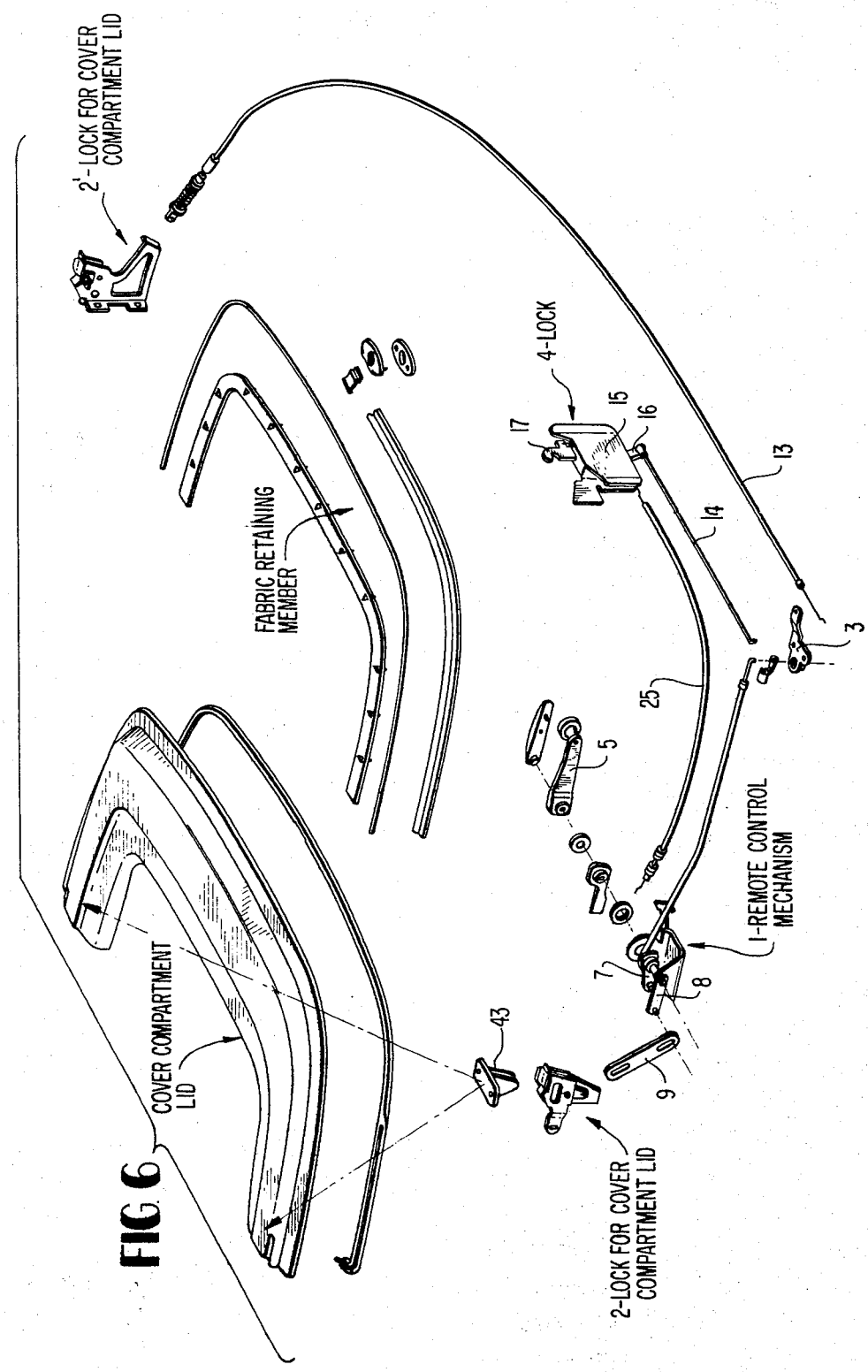

LOCK MECHANISM

The present invention relates to a closure and locking mechanism for a foldable-top compartment lid adapted to close a top compartment receiving the foldable top and to a locking and stretching mechanism for a curved fabric-retaining member forming the rear termination of the foldable top of a passenger motor vehicle, whereby two locking mechanisms disposed opposite one another in the vehicle transverse direction for the top compartment lid as well as also a lock receiving the fabric-retaining member are adapted to be transferred into an unlocked or unlatched position by way of a remote control installation arranged in the passenger space.

In a known passenger motor vehicle having a foldable top and a box or compartment intended for the accommodation of the folded-together top, the crank-actuated remote control installation is operatively connected by way of a linkage with the one locking mechanism for the top compartment lid which is disposed nearer the remote control installation, whereby a Bowden cable is pivotally connected to the remote control installation, by means of which both the lock for the curved fabric-retaining member as also the other locking mechanism for the top compartment lid are adapted to be unlocked or unlatched. For purposes of stretching or tensioning this foldable top, two tensioning or stretching devices arranged at the upper frame of the windshield are actuated, when the curved fabric-retaining member is lowered and is engaged in the lock. This operation is complicated, particularly as service tools carried along in the vehicle have to be used that can be easily lost. Furthermore, during the alternate stretching operation, a stretch or tensioning distribution may occur in the fabric of the top which is unfavorable for the front window and the cover fabric, as a result of which the closing of the top (engagement of the closure mechanisms) can be carried out only with high force application under certain circumstances.

It is the aim of the present invention to construct a closure and locking mechanism of a foldable top which avoids the aforementioned disadvantages and drawbacks in such a manner that in addition to a safe and reliable unlocking or unlatching, also a stretching of the top can be achieved by the use of the interconnected remote control installation.

Accordingly, a closure and locking mechanism of the aforementioned type is proposed whereby according to the present invention two entrainment members are received by and mounted on the pivot shaft of the remote control installation, of which one entrainment member is operatively connected with the nearer lid locking device by way of a push-rod having elongated aperture guidances, and of which the other entrainment member is operatively connected with a bell crank by way of an angle rod and an adjoining connecting rod, at which, in addition to a Bowden cable leading to the second opposite lid locking device, also an actuating rod acting by way of a claw-lever on a latching lever in the lock for the fabric-retaining member is pivotally connected.

In one preferred embodiment of the present invention, the latching lever is pressed by the force of a spring engaging obliquely at the latching lever, against an angularly shaped guide means and carries out during the locking or latching operation a rectilinear downward movement guided by an elongated aperture, whereby the rectilinear movement is made possible by a cam which is yieldingly or elastically forced away, whereas during the unlocking or unlatching operation, the latching lever carries out a tilting movement as a result of the abutment thereof at the now fixedly supported cam, whereby the fabric-retaining member is unlatched or relased during this tilting movement, conditioned by the inherent stretch or prestress of the foldable top, i.e., the previously established tension in the foldable top is released by release of the top fabric-retaining member.

Especially with an older or also damaged foldable top, it might happen that by reason of the lacking inherent stretch or prestress, an automatic release no longer takes place. In order nonetheless to be able to tilt up the fabric retaining member, an actuating lever having a pivotally connected, sickle-shaped lever is arranged coaxially on the pivot shaft of the remote control installation, which is operatively connected by way of a Bowden cable with the lower end of the latching lever projecting out of the lock housing in the closed, stretched condition of the top.

The foldable top can be protected and secured against an undesired unstretching if the angle rod of the remote control installation during the closing operation is transferred together with the entrainment member into a position beyond a dead center position.

Accordingly, it is an object of the present invention to provide a closure and locking mechanism for foldable vehicle tops which avoids by simple means the aforementioned shortcomings and drawbacks encountered in the prior art.

Another object of the present invention resides in a closure and locking mechanism which avoids complicated operations and in particular the need for service tools for closing the foldable top.

A further object of the present invention resides in a closure and latching mechanism for a foldable top which avoids the need of the application of large forces for purposes of closing the top.

Still another object of the present invention resides in a closure and latching mechanism for foldable tops which enables proper operation, especially opening of a closed top, notwithstanding loss of inherent stress in the top fabric.

These and further objects, features and advantages of the present invention will become more apparent from the following description when taken in connection with the accompanying drawing which shows, for purposes of illustration only, one embodiment in accordance with the present invention, and wherein:

FIG. 6 is an exploded view illustrating somewhat schematically the overall installation of the present invention in relation to the associated parts of the top.

Figure 1:
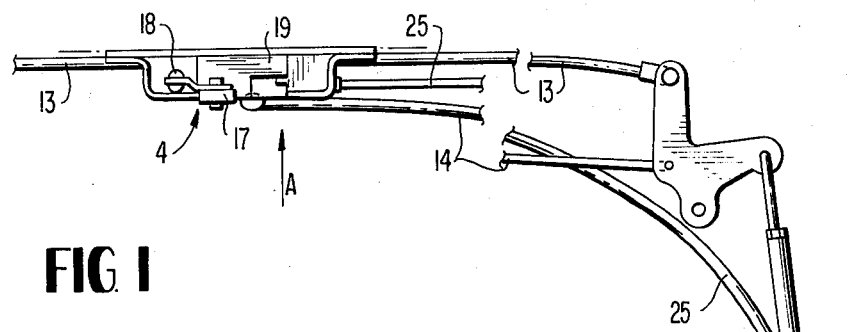
FIG. 1 is a plan view on a closure and locking mechanism with a lock, bell crank lever, remote control installation and a locking device in accordance with the present invention.

Referring now to the drawing wherein like reference numerals are used throughout the various views to designate like parts, the closure and locking mechanism illustrated in FIG. 1 essentially consists of a remote control installation generally designated by reference numeral 1, of a first locking device 2 disposed nearer the remote control installation 1 and of a bell crank 3, from which the adjusting movements introduced into the same are transmitted to a lock generally designated by reference numeral 4 for the rear fabric retaining member and to a second locking device 2' (FIG. 6) which is disposed opposite the first locking device 2.

Figure 2:
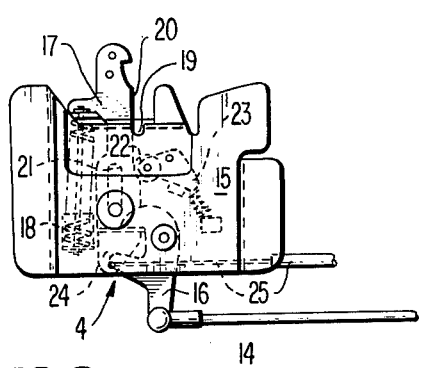
FIG. 2 is an elevational view on the lock for the fabric-retaining member taken in direction of arrow A of FIG. 1.
Figure 4:
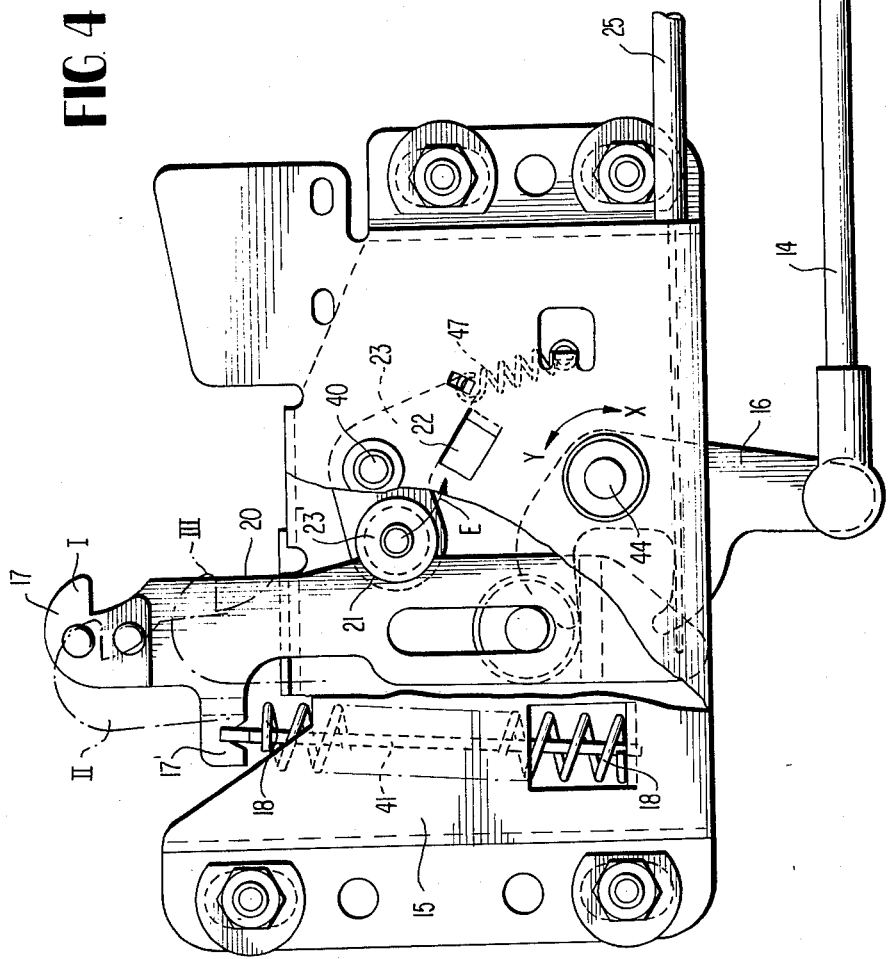
FIG. 4 is an elevational view similar to FIG. 2, with parts of the lock housing broken away to show more clearly the details of the lock.
Figure 5:
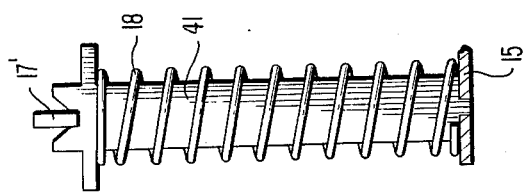
FIG. 5 is a partial cross sectional view illustrating the means for preventing buckling of the spring obliquely engaging at the latching lever.

Two entrainment members 7 and 8 are received by and mounted on a pivot shaft 6 of the remote control installation 1 provided with a hand crank 5. The entrainment member 8 is thereby operatively connected with the nearer locking device 2 by way of a push-rod 9 having elongated aperture guidances 10. An angle rod 11 which is pivotally connected at the entrainment member 7, is adjoined by a connecting rod 12 leading to a bell crank 3. A Bowden cable 13 leads from the bell crank 3 to the second approximately identical locking device 2' (FIG. 6) which is disposed opposite in the vehicle transverse direction with respect to the locking device 2 shown in FIG. 1. Furthermore, an actuating rod 14 is additionally pivotally connected at the bell crank 3 which, as can be seen in particular from FIGS. 2 and 4, is pivotally connected with a claw lever 16 rotatably supported within the lock housing 15 about a pivot point 44 (FIG. 4). The claw lever 16 is in operative connection with a locking or latching lever 17 which is urged in the direction toward an angularly shaped guide means 19 by the force of a spring 18 secured against buckling by a support member 41 (FIGS. 4 and 5) on the inside of the spring 18 and engaging in appropriate openings or notches provided in the housing 15 and in the latching member 17 or a projection 17' thereof. The side edge 20 of the latching lever 17 opposite the spring 18 is provided with a control cam surface 21, at which a spring-loaded, pivotally supported cam member 23, fixed resting at an abutment 22, abuts by way of its roller type engaging member 23' in such a manner that during a downward movement of the latching lever 17 into the position III thereof (FIG. 4) the cam member 23 elastically deflects by pivoting counterclockwise--as viewed in FIGS. 2 and 4--about its pivot point 40 against the action of spring 47 whereas during an upward movement of the latching lever 17, the cam member 23 is securely supported at the fixed abutment 22 and consequently, the latching lever 21 carries out a tilting movement into the position II (FIG. 4) which is initiated by the control cam member 21. During this tilting movement, the latching member releases the curved fabric-retaining member which then jumps up owing to the inherent stress or existing prestress of the fabric of the foldable top.

Figure 3:
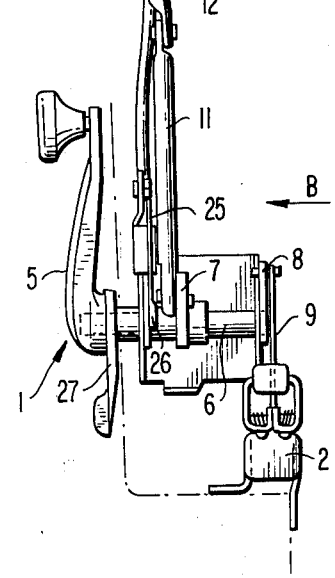
FIG. 3 is a side elevational view of the remote control installation as viewed in the direction of arrow B of FIG. 1.
Figure 3:
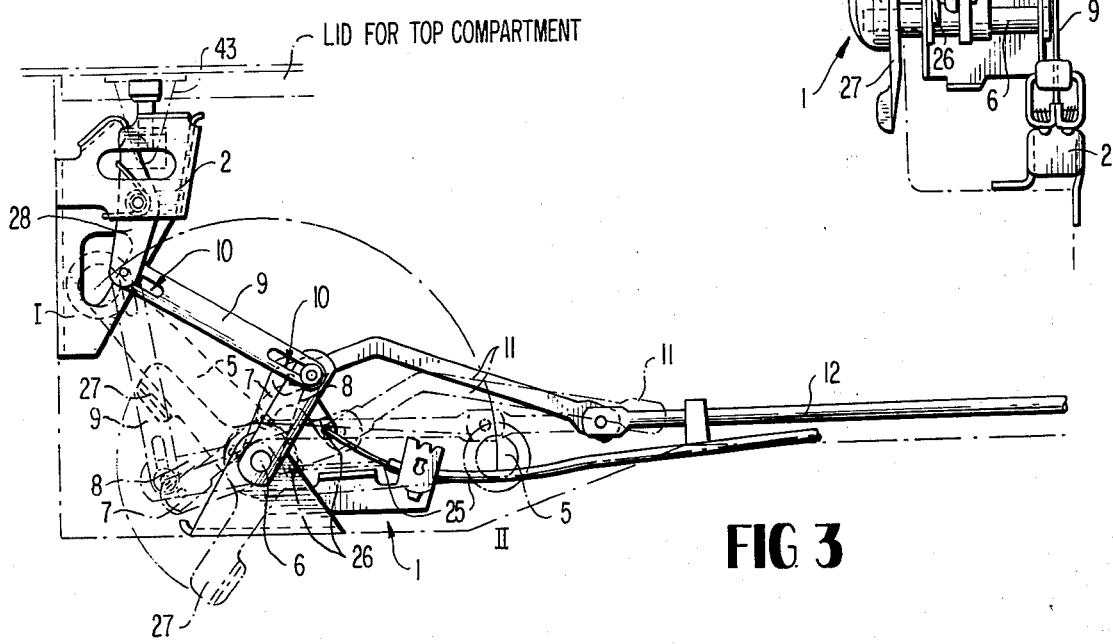

With an older or already damaged foldable top, the jumping up action of the fabric-retaining member might not occur during the unlocking operation due to an inadequate inherent or prestress stress. However, in order to create also in such a case the possibility for an unlocking operation, the lower end 24 of the latching lever 27 projecting out of the locking housing 15 in the closed condition of the top, is provided with a Bowden cable 25 which leads to a sickle-shaped lever 26 (FIG. 3). The lever 26 is pivotally connected to an actuating lever 27 which is arranged coaxially to the pivot shaft 6 of the remote control installation 1.

As is quite apparent the latching lever 17 assumes in its full line position I (FIG. 4) a position in which a snap-in action of the fabric-retaining member with its complementary member 43 (FIG. 6) is made possible. From this neutral position I, the latching lever 17 can be automatically transferred into the position II indicated in dash lines (FIGS. 4) by a further pivoting of the claw lever 16 about its pivot point 44 in the direction X. The locking action at the fabric-retaining member is thereby released, i.e., the fabric retaining member is disengaged from the latching lever 17 and jumps upwardly. The pivot movement of the latching lever 17 is due to the fact that in the position I, the cam member 23 which is pivotal about point 40 and is drawn against the abutment 22 by the tension spring 47, engages with the cam control surface 21 of the latching lever 17 and already with a slight upward stroke thereof, an abutment of the control surface 21 at the now non-yielding cam member 23 takes place.

If, on the other hand, the latching lever 17 is transferred from the position I to the position III thereof for purposes of stretching the top, which is possible by a pivoting action of the claw member 16 in the Y direction, then this downward movement of the latching lever 17 takes place rectilinearly i.e., without release of the curved fabric retaining member, since the cam member 23 can now elastically yield in the direction of arrow E (FIG. 4).

The crank 5 illustrated in FIG. 3 in dash and dot lines can assume three positions of which the two extreme positions are shown. If the crank 5 is in the position indicated by reference numeral I, then the angle rod 11 assumes its lower position, in which the connecting rod 12 has travelled far to the left as viewed in FIG. 3. The connecting rod 12 has thereby pulled the latching lever 17 into a lower latching position (not shown) by way of the bell crank 3, the adjoining actuating rod 14 and the pivotally connected claw lever 16 which now positively engages with the latching lever 17. The stretching or tensioning force of the top is thereby fed back into the pivot shaft 6 by way of the just described arrangement by reason of the over dead center position of the point of pivotal connection of the angle rod 11 at the entrainment member 7 by way of the latter in such a manner that an undesired, automatic unlatching cannot take place.

If the crank 5 is pivoted from the locking position designated by reference numeral I in the direction of the position designated by reference numeral II, then at first the latching lever 17 carries out a tilting movement during its upward movement in the manner already described which leads to a sudden jumping-up of the fabric-retaining member (not shown). At this instant the crank 5 is still in a position which is by a predetermined angular amount before the position II and the two entrainment members 7 and 8 have been displaced up to the position shown in full lines. The nearer locking device 2 as well as the oppositely disposed approximately identical further locking device 2' (FIG. 6) remain in their closing position since the spring-loaded catch hooks 28 thereof which lockingly engage the locking members 43 (FIGS. 3–6) fastened to the underside of the top compartment lid, have not yet been retracted.

This is achieved with the illustrated locking device 2 by the elongated aperture guidance 10 of the push rod 9, which compensate for the vertical movement of the entrainment member 8.

During the further pivot movement of the crank 5 into the position indicated by reference numeral II, the push rod 9 is now pulled toward the right, as a result of which the catch hook 28 is pivoted or deflected and the top compartment lid is unlatched. A similar unlocking operation takes place with the other, opposite locking device 2'. The angle rod 11 thereby assumes its outermost position illustrated in dash and dot lines. If one now releases the crank 5, then the latter pivots automatically toward the left by the aforementioned predetermined angular amount--conditioned by the return force of the spring-loaded catch hook 28. In this neutral position, both locking devices 4 as also the lock 2 are ready for the next locking operation.

While I have shown and described only one embodiment in accordance with the present invention, it is understood that the same is not limited thereto but is susceptible of numerous changes and modifications as known to those skilled in the art and I therefore do not wish to be limited to the details shown and described herein but intend to cover all such changes and modifications as are encompassed by the scope of the appended claims.

What I claim is:

1. A closure and locking mechanism for a foldable top compartment lid of a compartment receiving a foldable top and for a fabric retaining member forming the rear termination of the foldable top, which includes a remote control means arranged in the passenger space of the vehicle, two locking means disposed opposite one another in the vehicle transverse direction for releasably locking the compartment lid and a lock means for the fabric retaining member, said locking means as well as said lock means being operatively connected with said remote control means for transfer into an unlocked position, characterized in that the remote control means includes a pivot shaft having two entrainment means, one of said entrainment means being operatively connected with the nearer locking means by way of a push rod means having elongated aperture guide means, the other entrainment means being operatively connected with a bell crank means and both the other more remote locking means as well as said lock means being operatively connected with said bell crank means.

2. A locking mechanism according to claim 1, characterized in that a Bowden cable leading to the other locking means is operatively connected with said bell crank means while an actuating means operatively connects said lock means with the same bell crank means.

3. A locking mechanism according to claim 2, characterized in that the lock means includes a latching lever means and a claw lever means cooperating with said latching lever means, an actuating rod pivotally connected with said bell crank means being also operatively connected with said latching lever means by way of said claw lever means.

4. A locking mechanism according to claim 3, characterized in that the other entrainment means is operatively connected with the bell crank means by way of an angle rod means and a connecting rod means.

5. A locking mechanism according to claim 4, characterized in that the latching lever means is being urged against an angularly shaped guide means by the force of a spring means, said latching lever means being operable to carry out during a locking and top stressing operation, a rectilinear downward movement by elastically pushing away a cam means and by being guided by elongated aperture means, whereas during an unlocking operation, said latching lever means is operable to carry out a tilting movement due to an abutment at the cam means which is now fixedly supported.

6. A locking mechanism according to claim 5, characterized in that the fabric retaining member is released during the unlocking operation, conditioned by the stress in the foldable fabric.

7. A locking mechanism with a lock housing for the lock means, according to claim 6, characterized in that an actuating lever means operable to assure the release of the fabric retaining member is arranged on the pivot shaft of the remote control means substantially coaxially thereto which includes a sicle-shaped lever pivotally connected thereto, said sickle-shaped lever being operatively connected with the lower end of the latching lever means projecting out of the lock housing in the locked and closed condition of the top.

8. A locking mechanism according to claim 7, characterized in that the sickle-shaped lever is operatively connected with the latching lever means by way of a Bowden cable.

9. A locking mechanism according to claim 8, characterized in that the angle rod means of the remote control means is transferred during a closing operation together with the other entrainment means into an overdead center position.

10. A locking mechanism according to claim 1, characterized in that said lock means includes means enabling stretching of the foldable top upon latching engagement with said fabric-retaining member.

11. A closure and locking mechanism for a foldable-top compartment lid of a compartment receiving a foldable top and for a fabric retaining member forming the rear termination of the foldable top, which includes a remote control means arranged in the passenger space of the vehicle, two locking means disposed opposite one another in the vehicle transverse direction for releasably locking the compartment lid and a lock means for the fabric retaining member, said locking means as well as said lock means being operatively connected with said remote control means for transfer into an unlocked position, characterized in that the remote control means includes a pivot shaft having two entrainment means, one of said entrainment means being operatively connected with the nearer locking means, the other entrainment means being operatively connected with a bell crank means and both the other more remote locking means as well as said lock means being operatively connected with said bell crank means.

12. A locking mechanism according to claim 11, characterized in that said lock means includes means enabling stretching of the foldable top upon latching engagement with said fabric-retaining member.

13. A locking mechanism according to claim 11, characterized in that a Bowden cable leading to the other locking means is operatively connected with said bell crank means while an actuating means operatively connects said lock means with the same bell crank means.

14. A locking mechanism according to claim 11, characterized in that the lock means includes a latching lever means and a claw lever means cooperating with said latching lever means, an actuating rod pivotally connected with said bell crank means being also operatively connected with said latching lever means by way of said claw lever means.

15. A locking mechanism according to claim 1, characterized in that the other entrainment means is operatively connected with the bell crank means by way of an angle rod means and a connecting rod means.

16. A locking mechanism according to claim 15, characterized in that the angle rod means of the remote control means is transferred during a closing operation together with the other entrainment means into an over-dead center position.

17. A locking mechanism according to claim 11, characterized in that the latching lever means is being urged against an angularly shaped guide means by the force of a spring means, said latching lever means being operable to carry out during a locking and top stressing operation, a rectilinear downward movement by elastically pushing away a cam means and by being guided by elongated aperture means, whereas during an unlocking operation, said latching lever means is operable to carry out a tilting movement due to an abutment at the cam means which is now fixedly supported.

18. A locking mechanism according to claim 17, characterized in that that fabric retaining member is released during the unlocking operation, conditioned by the stress in the foldable fabric.

19. A locking mechanism with a lock housing for the lock means, according to claim 11, characterized in that an actuating lever means operable to assure the release of the fabric retaining member is arranged on the pivot shaft of the remote control means substantially coaxially thereto which includes a sicle-shaped lever pivotally connected thereto, said sickle-shaped lever being operatively connected with the lower end of the latching lever means projecting out of the lock housing in the locked and closed condition of the top.

20. A locking mechanism according to claim 19, characterized in that the sickle-shaped lever is operatively connected with the latching lever means by way of a Bowden cable.

* * * * *